(12) United States Patent
Broberg

(10) Patent No.: US 6,604,883 B2
(45) Date of Patent: Aug. 12, 2003

(54) UNIVERSAL CONNECTOR FOR REMOTE CONTROL VEHICLES

(75) Inventor: James Broberg, Crystal Lake, IL (US)

(73) Assignee: Du-Bro Products, Inc., Wauconoa, IL (US)

( * ) Notice: Subject to any disclaimer, the term of this patent is extended or adjusted under 35 U.S.C. 154(b) by 0 days.

(21) Appl. No.: 09/968,853

(22) Filed: Oct. 2, 2001

(65) Prior Publication Data

US 2002/0081145 A1 Jun. 27, 2002

Related U.S. Application Data

(63) Continuation-in-part of application No. 09/672,426, filed on Sep. 28, 2000, now Pat. No. 6,364,566.

(51) Int. Cl.$^7$ ................................................ F16S 9/00
(52) U.S. Cl. ........................ 403/154; 403/324; 403/319
(58) Field of Search ................................ 403/150, 151, 403/154, 152, 153, 161, 157, 324, 79, 319, 321

(56) References Cited

U.S. PATENT DOCUMENTS

| | | | | |
|---|---|---|---|---|
| 3,984,191 A | * | 10/1976 | Doty | 403/155 X |
| 4,735,534 A | * | 4/1988 | Oehlke | 403/155 X |
| 6,039,500 A | * | 3/2000 | Kwon | 403/78 |
| 6,152,642 A | * | 11/2000 | Berthold et al. | 403/155 |

* cited by examiner

Primary Examiner—Lynne H. Browne
Assistant Examiner—John Cottingham
(74) Attorney, Agent, or Firm—Niro, Scavone, Haller & Niro

(57) ABSTRACT

A connector for use with a remote controlled apparatus comprising a base adapted to receive a control member and a contact surface adapted to slidingly receive a latch. Two fingers extend outwardly from the base and the latch has opposingly located deformable prongs which engage a pin and two arms which engage a contact surface found on the base. The latch is slidingly operable on the contact surface of the base between a locked and an unlocked position. In the locked position, the fingers of the base and the pin form a closed, unopenable structure. In the unlocked position, the fingers and the pin form an openable structure.

10 Claims, 3 Drawing Sheets

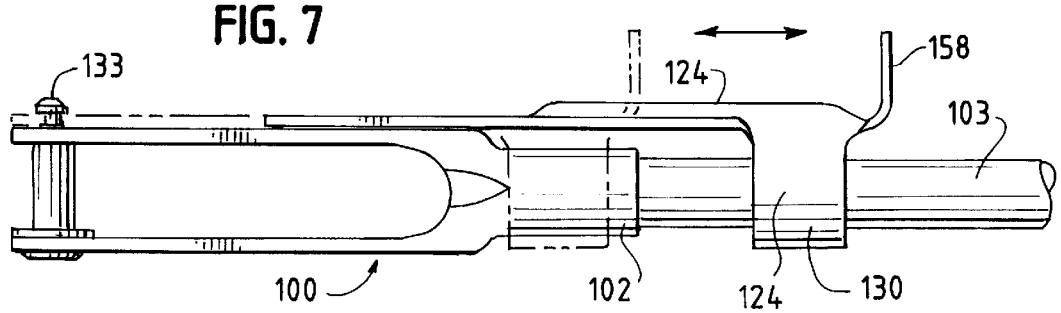
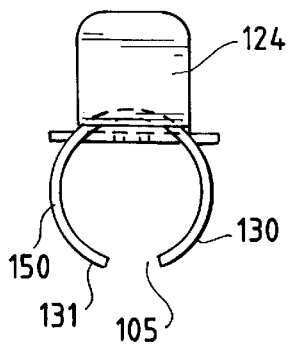
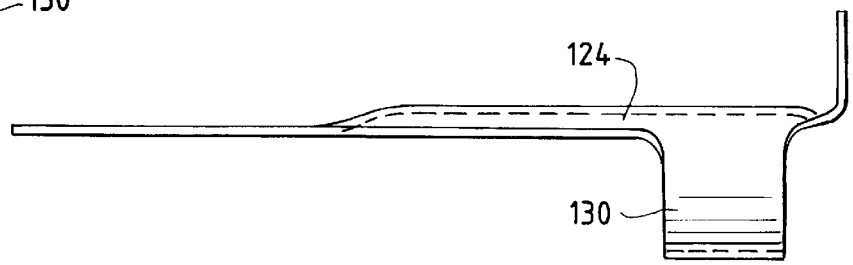
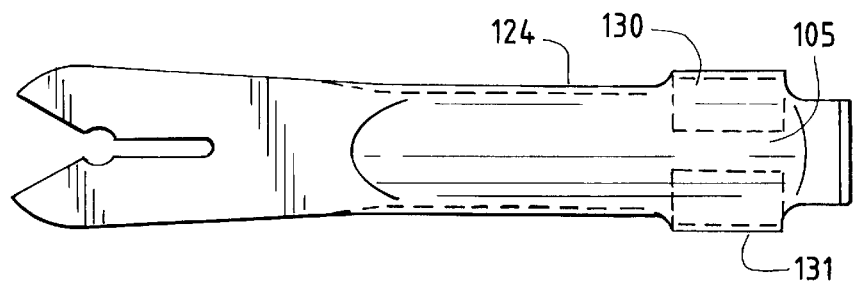
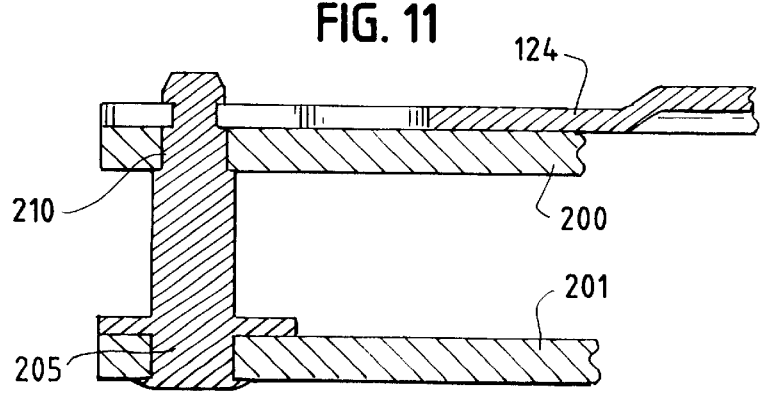

UNIVERSAL CONNECTOR FOR REMOTE CONTROL VEHICLES

This is a Continuation-in-Part of application Ser. No. 09/072,426, filed Sep. 28, 2000, now U.S. Pat. No. 6,364,566

BACKGROUND OF THE INVENTION

The present invention relates to a universal connector that is used to link various components of a remote controlled vehicle such as hobby aircraft together. More specifically, the present invention concerns a U-shaped connector that includes a self-contained latch which coacts with a pin.

SUMMARY OF THE INVENTION

In remote control aircraft, as well as other hobby vehicles, a number of moving parts need to be linked together in order to operate the device. To do this, connectors are often used which link moving parts such as a servo arm to the control horn of a flap.

However, by design, the parts of a remote control vehicle are often reduced in size, and as a result, the components are often difficult to manually manipulate and are difficult to keep from losing. This is especially true with respect to retaining pins and locking clips.

The present invention is designed to provide a more user friendly connector in which the latch or locking clip forms part of the connector. This makes the device easier to use and reduces incidence of losing the small sized clips during use.

DESCRIPTION OF THE DRAWINGS

These and other features, objects and advantages of the present invention will become apparent from the following description and drawings wherein like reference numerals represent like elements in several views, and in which:

FIG. 7 is a side of the embodiment shown in FIG. 6;

FIG. 8 is a cross-sectional view of the latch shown in FIGS. 6 and 7;

FIG. 9 is a side view of the latch shown in FIGS. 6 and 7;

FIG. 10 is a bottom view of the latch shown in FIGS. 6 and 7; and

FIG. 11 is a partial cross-sectional view of the latch shown in FIGS. 6 and 7.

DESCRIPTION OF THE PREFERRED EMBODIMENT

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
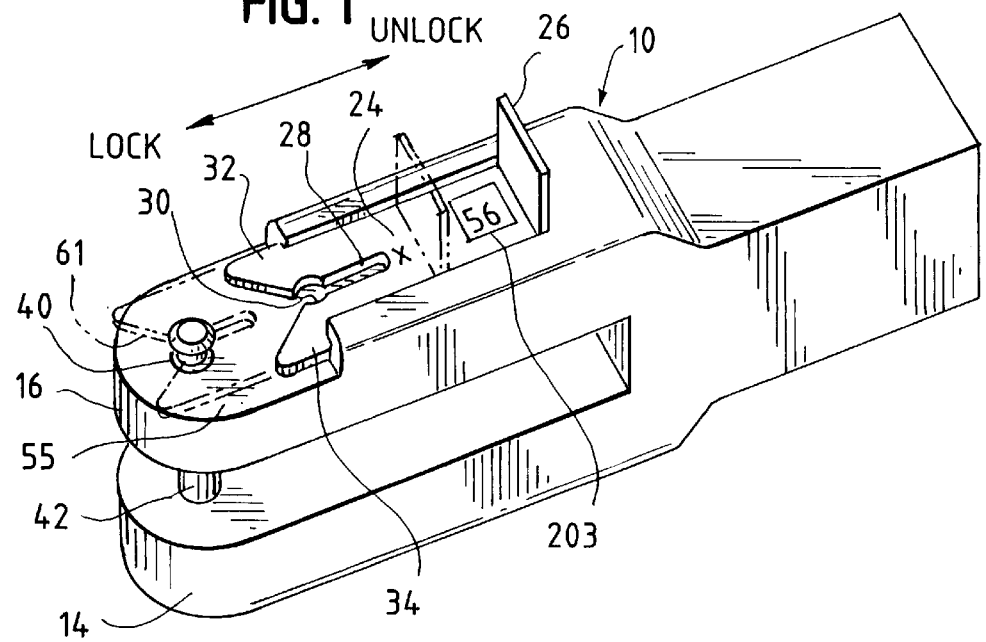
FIG. 1 is a perspective view of one embodiment of the invention showing the latch in a locked and unlocked position.
Figure 2:
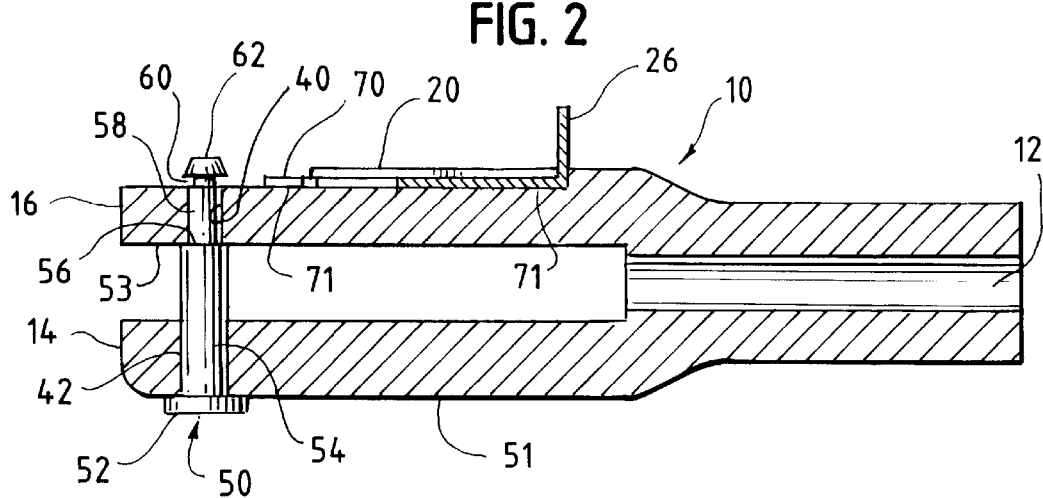
FIG. 2 is a cross-sectional view of the embodiment shown in FIG. 1.

As shown in FIGS. 1 and 2, the present invention includes a base 10, which includes an aperture 12 which is sized to receive a control rod (not shown). Typically, the control rod is self-tapping, and thus, locks into position within aperture 12.

Figure 3:
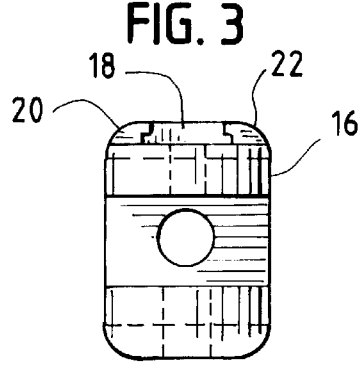
FIG. 3 is a front view of the embodiment shown in FIG. 2.
Figure 4:
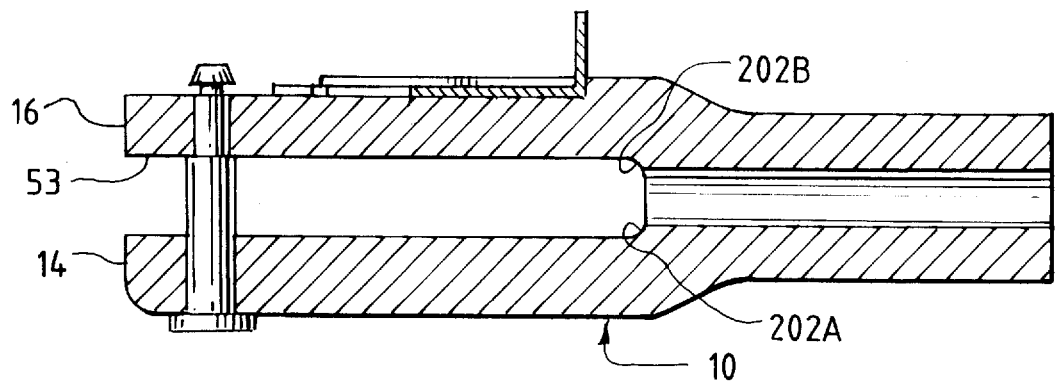
FIG. 4 is a cross-sectional view of an alternate embodiment of the present invention.
Figure 5:
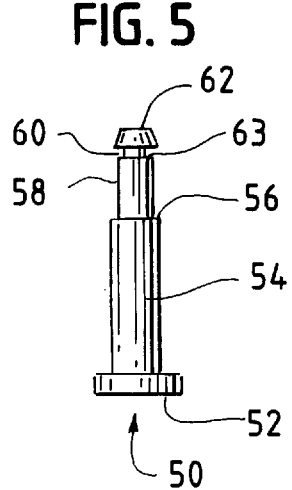
FIG. 5 is a cross-sectional view of a pin used with the invention.

Extending outwardly from base 10 are fingers 14 and 16. As shown in FIG. 3 channel 18 is formed in finger 16 by L-shaped walls 20 and 22. Of course, channel 18 may be located on finger 14 as well. Since base 10 may be made of plastic, its components may be simply created as a single molded unit. However, as shown in FIG. 4, angled or radius portions 202A and 202B may be added to the juncture where the fingers joint the base. Increasing the material or mass used in this location reduces unwanted breakage during the use of the fingers.

Located within channel 18 is a latch 24 having a handle 26. Latch 24 also includes a slit 28 and aperture 30 which separates opposingly located prongs 32 and 34. As shown in FIG. 1, latch 24 is also operable between a locked and unlocked position. Latch 24 may also include on it imprinted identification 203 which identifies the size of the control rod which would fit within aperture 30.

Located on fingers 14 and 16 are apertures 40 and 42. The apertures are aligned so that pin 50 may be inserted into the apertures. As is also shown in FIG. 2, the diameter of the aperture located on finger 14 is larger than the aperture located on finger 16.

As shown in FIG. 2, pin 50 includes a head 52, a first portion 54 which is sized to fit within aperture 42. Also included is an internal stop 56 and second portion 58 which is sized to fit within aperture 40. Pin 50 also has a terminal end 62 which includes an annular groove 60.

In use, the aircraft piece to be connected is inserted between fingers 14 and 16 so that pin 50 may be inserted through an aperture in the aircraft component. To do this pin 50 is inserted into apertures 40 and 42. As shown in FIG. 2, head 52 engages wall 51 of finger 14 and acts as a stop when pin 50 is fully inserted.

Internal stop 56 is also positioned to engage inner surface or wall 53 of finger 16. This engagement assists in properly aligning groove 60 by causing lower edge 63 of groove 60 to be flush with wall 55 of finger 16.

Once groove 60 is properly positioned, latch 24 may be slidingly moved from an unlocked position into a locked position. When operated to secure pin 50, the first portion to engage pin 50 is V-shaped notch 61. As latch 24 is pressed against pin 50, the engagement forces prongs 32 and 34 to spread apart so that pin 50 may be received by aperture 30. Slit 28 permits this spreading or deformation to occur. Once aperture 30 is positioned around groove 60 of pin 50, prongs 32 and 34 snap inwardly resulting in the upper and lower surfaces 70 and 71, respectively, to seat within groove 60. This engagement prevents pin 50 from disengaging latch 24 which locks the pin into position. To unlock this pin, the opposite steps are used.

Latch 24 is also frictionally fitted within channel 18 and slidingly engaged by walls 20 and 22. This arrangement permits latch 24 to articulate within channel 18 while still being secured to base 10. This makes the latch easier to use and reduces the incidence of losing a free-standing clip or latch.

Also making the device easier to use are the two different sized apertures in the fingers and two stops, 52 and 56, on the pin. This arrangement acts to consistently place the groove in a proper alignment so as to receive latch 24. Again, when dealing with small parts, this ability to achieve proper alignment makes the device easier to operate. Thus, not only may the present invention be beneficially used with remote-controlled aircraft, the invention is also useful with other hobby type vehicles such as cars, boats, sailboats, and helicopters as well.

Figure 6:
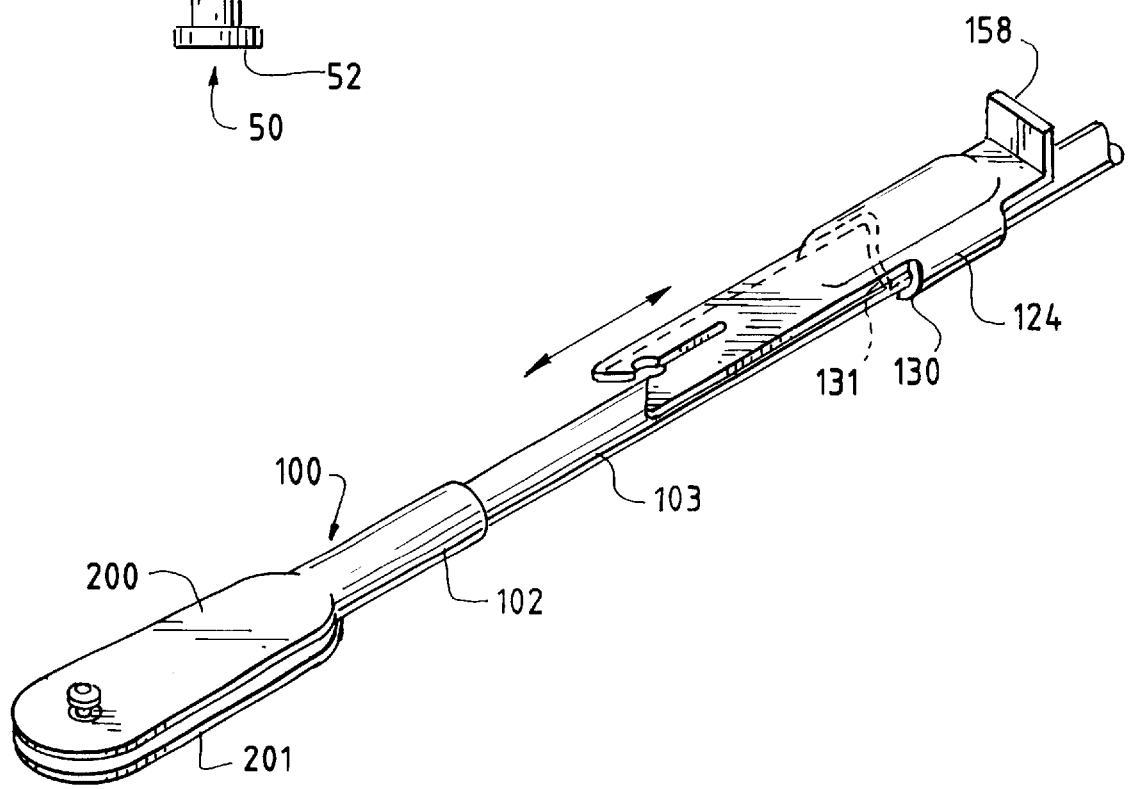
FIG. 6 is a perspective view of another embodiment of the present invention.

Another way to make the device is to employ latch 124 as shown in FIGS. 6–10. In this embodiment, base 100 includes rounded distal end portion 102, which defines a contact surface that is adapted to receive control rod 103. Base 100 also includes opposingly located arms 200 and 201 and pin 205 as shown in FIGS. 6 and 11. Pin 205 is stepped in configuration and may be permanently mounted to one of arms 200 or 201. In the embodiment shown, pin 205 is mounted to arm 201 and arm 200 includes an aperture 210 which receives pin 205.

Arm 200 is movable so that it may be lifted off of pin 205 to allow pin 205 to be placed inside an object to be connected. The arm and pin arrangement forms a clip-like structure which is designed to releasably engage other objects. In a locked position, the clip-like structure cannot be opened. In an unlocked position, the clip-like structure may be opened by lifting one of the arms off of the pin.

Latch 124 is of a similar design as described above but includes two opposingly located curved arms 130 and 131. Each arm extends inwardly and together form a circular-like arc which is about 320 degrees. That the arms do not form a complete circle leaves aperture 105. As will be described in more detail below, this arrangement allows latch 124 to engage rod 103.

In operation, latch 124 is affixed by locating rod 103 in aperture 105. Next latch 124 is mounted to base 100 by sliding it into engagement with portion 102 as shown in FIG. 7 through the use of handle 158. Because the inner contact surface 150 defined by arms 130, 131 and latch 124 forms a shape which releasably mates with the shape of distal portion 102 of base 100, the latch is held in place on the device and able to engage pin 133. Once pin 133 is engaged, the arm and pin engagement is locked in place and the resulting clip cannot be opened. While circular shapes are shown, other contact surfaces having shapes which would produce a snug or friction fit would be equally suitable. By configuring the latch and base in this manner, the incidence of losing the latch during use is reduced.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A connector for use with a remote controlled apparatus comprising:

a base adapted to receive a control member and a contact surface adapted to slidingly receive a latch;

two fingers extending outwardly from said base;

said latch having opposingly located deformable prongs which engage a pin and two arms which engage said contact surface of said base;

said latch slidingly operable on said contact surface of said base between a locked and an unlocked position;

in said locked position, said fingers of said base and said pin form a closed, unopenable structure and in said unlocked position said fingers and said pin form an openable structure.

2. The device of claim 1 wherein said arms are curved.

3. The device of claim 2 wherein said contact surface of said base which receives said latch is round.

4. The device of claim 1 wherein said latch includes a handle.

5. A connector assembly comprising:

a latch and a base adapted to receive an object to be connected;

two opposingly located fingers extending from said base;

said base having a contact surface adapted to slidingly receive said latch;

one of said fingers adapted to releasably receive a retaining pin;

said latch positionable on said contact surface of said base between an unlocked and locked position; and in said locked position said pin is secured by said latch and in said unlocked position said pin is removable.

6. The device of claim 5 wherein said latch is positionable on said base by locating said latch in a pair of grooves located on said base.

7. The device of claim 5 wherein said latch defines an opening which is shaped to engage said contact surface of said base so as to permit said latch to be positionable on said base.

8. The device of claim 7 wherein said opening is defined by a pair of opposingly located arms.

9. The device of claim 7 wherein said opening is complimentary in shape to said contact surface of said base.

10. The device of claim 8 wherein said arms are curved.

* * * * *